Sept. 17, 1940.　　　B. G. RUDERT　　　2,215,409
LAWN EDGER
Filed Aug. 3, 1939　　　2 Sheets-Sheet 1
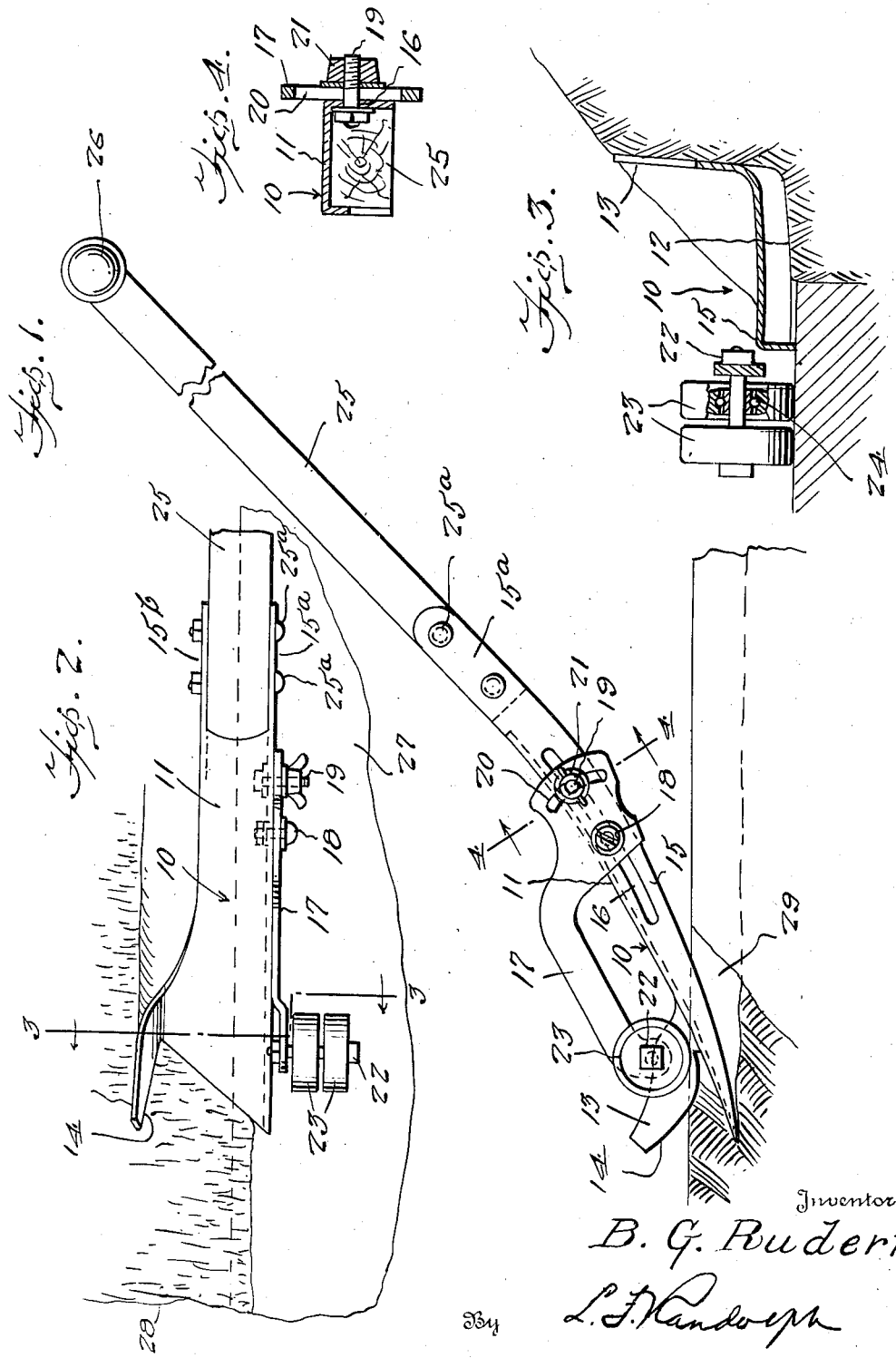
Inventor
B. G. Rudert
By L. F. Randolph
Attorney Sept. 17, 1940. B. G. RUDERT 2,215,409
LAWN EDGER
Filed Aug. 3, 1939 2 Sheets-Sheet 2
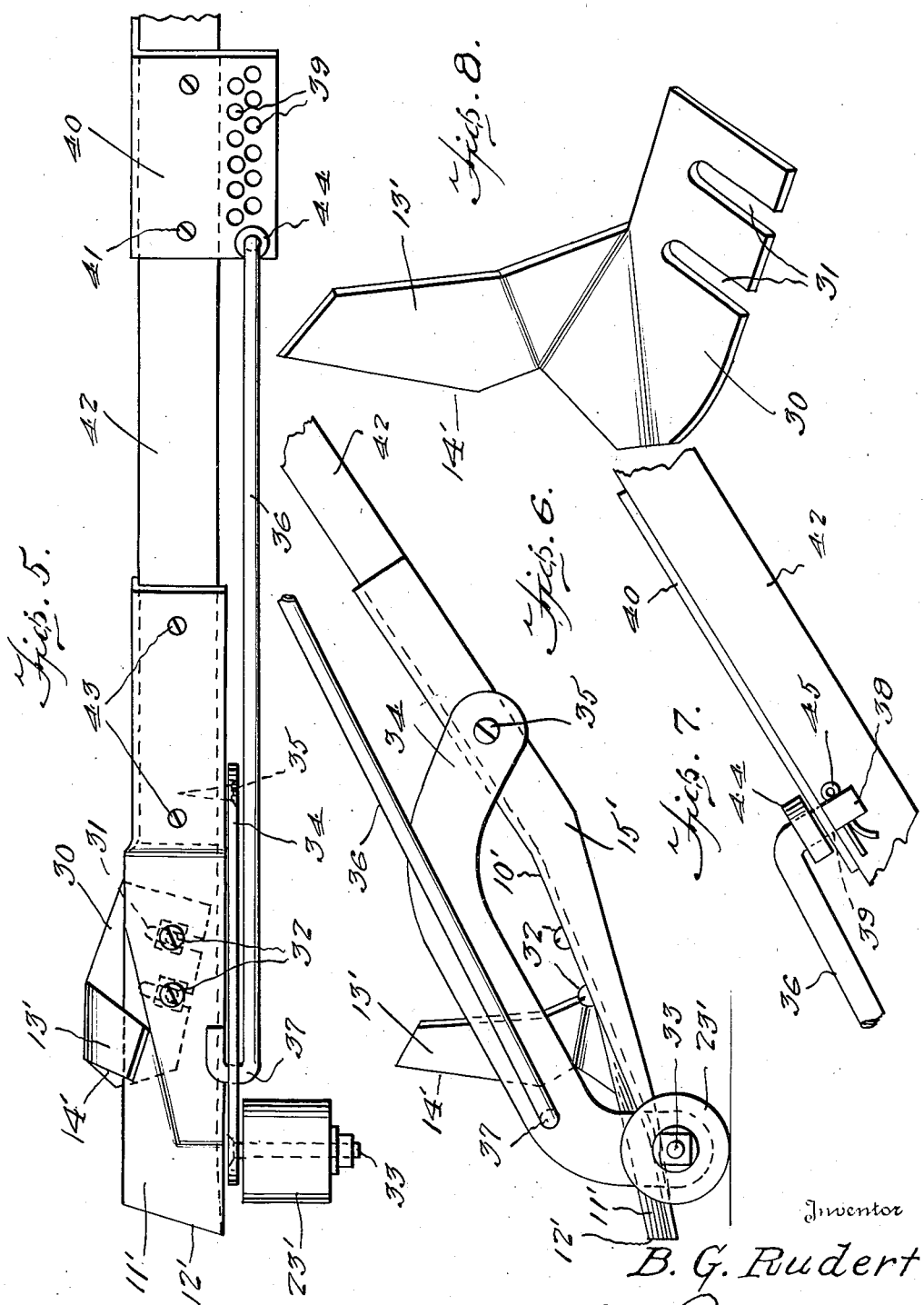

Patented Sept. 17, 1940

2,215,409

UNITED STATES PATENT OFFICE 2,215,409

LAWN EDGER

Benjamin G. Rudert, Cape Girardeau, Mo.

Application August 3, 1939, Serial No. 288,212

3 Claims. (Cl. 97—227)

This invention relates to a lawn edger.

It is aimed to provide a novel implement operable by hand, which will effectively and expeditiously edge a lawn, for instance by trimming a terrace, the portion of soil which may overlap a cement walk, provide a groove at the junction of the soil with the cement walk and otherwise.

A particular object is to provide a novel stock or share which will control the horizontal and vertical cutting or severance of the lawn and soil, in association with novel roller gauge means for adjusting the height of operation.

Another object is to provide such a stock or share with a side depending flange to serve as a gauge.

In addition, I aim to provide for the mounting of the roller in one form by means of an elongated slot and pivotal connection and in another form by means of a rod and pivotal connection.

The more specific objects and advantages will become apparent from a consideration of the description following taken in connection with accompanying drawings illustrating an operative embodiment.

In said drawings:

Figure 1 is a view in elevation showing one form of lawn edger in accordance with the invention;

Figure 2 is a plan view of the parts of Figure 1;

Figure 3 is a vertical section taken on the plane of line 3—3 of Figure 2;

Figure 4 is a criss sectional view taken on the line 4—4 of Figure 1;

Figure 5 is a plan view of a modified form of the invention;

Figure 6 is a fragmentary vertical view of such modified form;

Figure 7 is a fragmentary side elevation of the adjusting rod and its connection, and Figure 8 is a perspective view of the removable vertical cutter employed in the modified form.

Referring specifically to the drawings and first to the form shown in Figures 1 to 4, I employ a cutter 10 in the form of a stock or share generally in the form of a plate 11, extending downwardly and forwardly at a slight curve and terminating at 12 in a diagonal cutting edge. Such plate 11 is widened adjacent such edge 12 and has an upstanding or vertical cutter 13 sharpened along its lower or curved edge 14.

Stock 10 has a depending flange 15 along one side thereof, increasing in width from the edge 12 in rearward direction. An elongated slot 16 is provided in flange 15 and a bracket 17, generally of L-shape, is pivotally connected to the flange 15 by means of a bolt 18 extending through the slot 16, a bolt 19 extends through slot 16 and through an arcuate slot 20 concentric with the axis of bolt 18, and which bolt 19 has a wing nut 21 thereon, for rigid fastening of the parts together in different adjusted positions. At the forward end, bracket 17 mounts an axle or bolt 22 on which one or any desired number of rollers 23 may be journaled, preferably by means of ball bearings 24.

Flange 15 is extended rearwardly into a shank 15a while a similar shank 15b is provided at the opposite side of the stock 10. Between the shanks, a suitable handle 25 is fastened by removable bolts 25a, the handle preferably having a grip 26 on each side thereof, to facilitate tilting of the implement in use. The implement may be used in various ways in edging a lawn, for instance as shown in Figures 2 and 3, the rollers 23 may travel on a concrete walk 27 with the edges 12 and 14 trimming an adjacent terrace 28 by removing that portion of the soil which overlaps the walk 27 and some of the soil beyond the walk. In addition, the rollers 23 may be sod adjusted as to travel on the walk, with the edges 12 and 14 below the upper surface of the soil, as in Figure 1 and with the flange 15 in contact with the concrete 27, thereby providing a groove in the soil as suggested at 29.

Various changes may be resorted to provided they fall within the spirit and scope of the invention. For instance, I may use the form suggested in Figures 5 to 8. In this form, the stock is shown at 10' as having a plate 11' with a forward cutting edge 12' and a downwardly extending side flange 15'. An upright or vertical cutter is provided at 13' being sharpened at the forward edge as as 14'. This cutter 13' may be integral on the stock 11' like in the first form of the invention or the first form of the invention may employ a cutter 13' like the second form of the invention. This cutter 13' is preferably removably mounted by means of an angular portion 30 having elongated slots 31, open at one edge thereof and adjustably engaging and clamped in place by bolts 32.

A single roller is used in this form at 23' to function similarly to the rollers 23. Roller 23' is mounted on an axle 33 carried by a bracket 34 pivoted at 35 to the flange 15' and which bracket has a rod 36 pivotally hooked thereto at 37 and has a terminal lug 38 arranged for selective engagement in holes 39 of a plate 40 fastened at 41 on a handle 42, screwed at 43 to the stock 11'.

Above the plate 40, lug 38 may have a stop 44 thereon and below the same may have an opening accommodating a cotter key at 45.

The modified form of the invention may be adjusted by securing the lug 38 in any selected slot 39, and operated in the manner described with respect to the first form of the invention.

I claim as my invention:

1. An edger of the class described having a stock provided with a forward cutting edge and a vertical cutting edge adjacent the same, said stock having an integral flat depending flange along one side thereof, a bracket pivoted to and in flat contact with said flange, a gauge roller on the opposite side of the bracket to the flange carried by said bracket forwardly of its pivot and adjacent the forward end of the stock, said bracket in the rear of the roller being spaced above the stock, a rod pivoted to said bracket, and means to secure the rod in different adjusted positions.

2. An edger of the class described having a stock provided with a forward cutting edge and a vertical cutting edge adjacent the same, said stock having a depending flange along one side thereof, a bracket pivoted to said flange, a gauge roller carried by said bracket adjacent the forward end of the stock, a rod pivoted to said bracket, means to secure the rod in different adjusted positions, comprising a plate on the device having a plurality of slots therein, and a pin on the rod selectively engageable in said slots.

3. An edger of the class described having a stock provided with a forward cutting edge and a vertical cutting edge adjacent the same, said stock having a depending flange along one side thereof, a bracket pivoted to said flange, a gauge roller carried by said bracket adjacent the forward end of the stock, a rod pivoted to said bracket, means to secure the rod in different adjusted positions, comprising a plate on the device having a plurality of slots therein, a pin on the rod selectively engageable in said slots, said vertical cutter being adjustable.

BEN. G. RUDERT.